Figure 1:
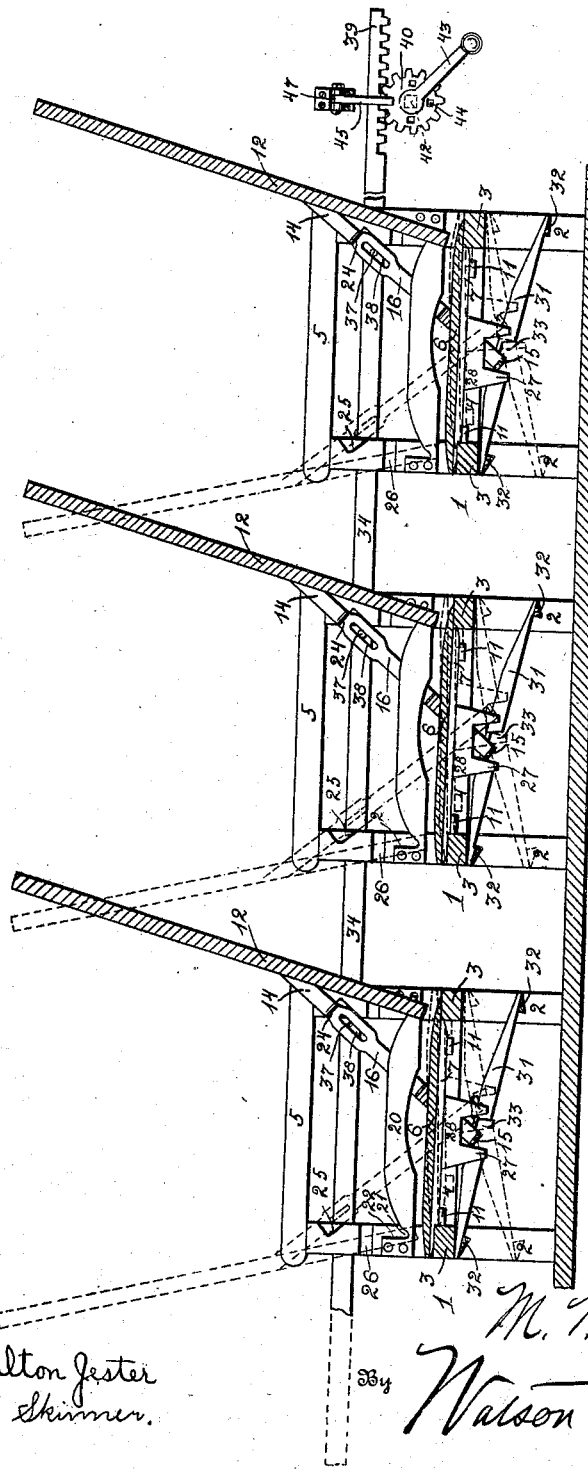

M. M. MURCHISON.
CAR SEAT.
APPLICATION FILED OCT. 12, 1907.

923,196.

Patented June 1, 1909.
3 SHEETS—SHEET 2.

Fig. 2.

Fig. 3.

Witnesses
J. Milton Jester
M. L. Skinner

Inventor
M. M. Murchison
By Watson E. Coleman
Attorney

M. M. MURCHISON.
CAR SEAT.
APPLICATION FILED OCT. 12, 1907.
923,196.
Patented June 1, 1909.
3 SHEETS—SHEET 3.
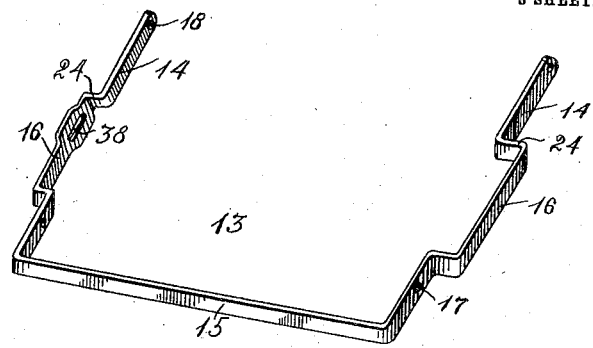
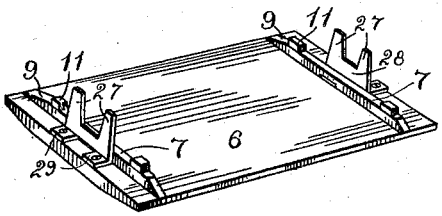
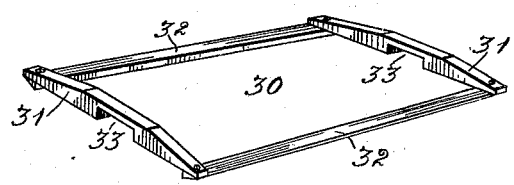
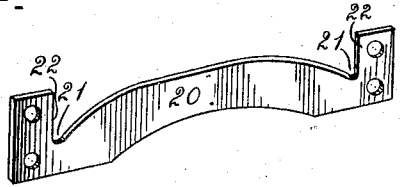
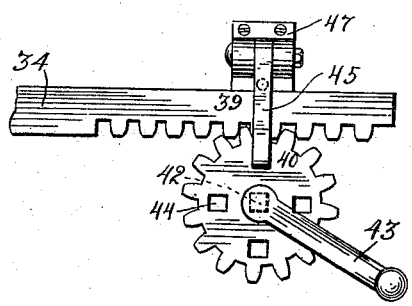
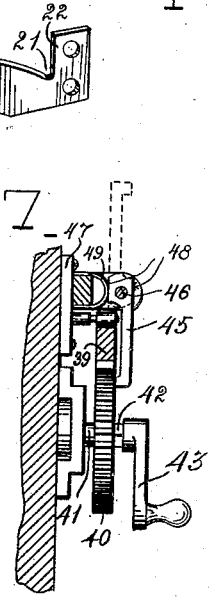
Witnesses
J. Milton Jester.
M. L. Skinner.
Inventor
M. M. Murchison
By Watson E. Coleman
Attorney
THE NORRIS PETERS CO., WASHINGTON, D. C.

UNITED STATES PATENT OFFICE.

MURDOC M. MURCHISON, OF WINSTON SALEM, NORTH CAROLINA.

CAR-SEAT.

No. 923,196.  Specification of Letters Patent.  Patented June 1, 1909.

Application filed October 12, 1907.  Serial No. 397,181.

*To all whom it may concern:*

Be it known that I, MURDOC M. MURCHISON, a citizen of the United States, residing at Winston Salem, in the county of Forsyth and State of North Carolina, have invented certain new and useful Improvements in Car-Seats, of which the following is a specification, reference being had to the accompanying drawings.

My invention relates to improvements in seats for railway cars, street cars and the like.

One object of the invention is to provide a car or coach seat having shiftable back, bottom and foot rest sections which may be readily operated to reverse the seat.

Another object of the invention is to provide a seat of this character which will be simple and practical in construction so that it will be strong and durable and may be produced at a comparatively small cost.

Another object of the invention is to provide means whereby all of the seats on one side of a car or as many of them as may be desirable, may be simultaneously reversed.

With the above and other objects in view, the invention consists of the novel features of construction and the combination and arrangement of devices hereinafter described and claimed, and illustrated in the accompanying drawings, in which—

Figure 1 is a vertical cross sectional view through a series of my improved reversible car seats and the improved means for simultaneously reversing them, the parts being shown in one position in full lines and in a reversed position in dotted lines; Fig. 2 is a perspective view of one of the seats, portions of the same being broken away and in section to more clearly illustrate the construction; Fig. 3 is a vertical longitudinal section through one of the seats; Fig. 4 is a perspective view of the hanger; Fig. 5 is a similar view of the seat bottom looking at the under face of the same; Fig. 6 is a perspective view of the double foot rest; Fig. 7 is a similar view of one of the guides and supports for the lower portion of the seat back; and Figs. 8 and 9 are detail views of the device for operating and locking the reversing bar.

My improved seats are adapted to be arranged along each side of a car or coach and each comprises a suitable frame 1, here shown as consisting of four upright posts or legs 2 connected by longitudinal or side bars 3 and lower and upper end or cross bars 4, 5, the upper bars 5 forming hand rails; but it will be understood that this supporting frame may be of any other suitable form and construction and made of wood or metal.

Arranged within the seat frame is a shiftable seat bottom 6 which may be of any suitable form and construction. Said seat bottom is mounted so as to have a limited transverse sliding and tilting movement in the frame and the same is preferably accomplished by providing upon the under face of said seat adjacent to its ends transversely extending strips or cleats 7 which are adapted to enter and slide in guides 8 in the form of notches or seats provided at opposite points in the side bars 3. The guide strips 7 have their ends beveled or inclined as at 9 to engage the inclined or beveled bottom faces 10 of the notches or seats 8 so that as the seat bottom is shifted transversely or in a forward and rearward direction the seat bottom will assume a slightly tilted or inclined position as clearly shown in Fig. 1. The shifting movement of the seat bottom is preferably limited by providing upon said strips 7 projections or enlargements 11 which form stop shoulders and engage the inner faces of the side bars 3.

Each of the seats is also provided with a shiftable or reversible seat back 12 which may be of any suitable form and construction and which is pivotally hung in a hanger 13. This hanger is preferably of substantially U-shape, consisting of upright hanger arms 14 united at their lower ends by a cross portion or connecting bar 15 and having intermediate their ends laterally offset portions 16. The hanger 13 is mounted in the seat frame for swinging or locking movement in a forward and rearward direction and it is hung upon pivots 17 arranged centrally in the lower cross bars 4 of the frame and in the lower portions of the arms 14 of the hanger, so that the cross bar 15 is arranged in the lower portion of the seat frame while the offset portions 16 of the arms 14 are adapted to swing in the upper portion of the same between the uprights 2. The seat back 12 is hung between the upper free ends of the arms 14 upon pivots 18 which are arranged in said arms and upon the opposite sides of the seat back at points nearer to the upper edge of the latter so that said seat back is overbalanced and will tend to assume a vertical position whenever it is permitted to do so. The lower or overbalanced portion of the seat back may be guided by any suitable means but I preferably employ that illustrated which consists in providing adjacent to the lower corners of the seat back outwardly projecting pins or studs 19 which are adapted to engage guides 20 in the form of plates arranged between the posts 2 at each end of the seat and secured to their inner faces as shown. The pins 19 are adapted to rest and slide upon the guide plates 20 and to enter recesses or seats 21 formed in said plates adjacent to their ends. The seats 21 have abrupt outer sides or shoulders 22 and their inner sides are curved outwardly and inwardly so as to direct the pins 19 into said seats as will be readily understood. From the foregoing it will be seen that when the hanger is shifted from one side of the seat frame to the other it will carry the back 12 with it to reverse the position of the latter, and in said movement of the hanger the arms 14 will elevate the seat back to lift the pins 19 out of the keeper seats 21 at one side of the seat frame and then lower said back to drop said pins into the corresponding seats at the other side of the frame. The arms 14 are formed with the offset portions 16 for the double purpose of rendering the device more compact and providing stop shoulders 24 which engage the posts 2 or suitable stop recesses or notches 25 formed therein as clearly shown in the drawings.

In the inner faces of the posts 2 are formed transverse grooves or channels 26 through which the pins 19 may be passed, when the hanger 13 is in a vertical position, so that said pins may be supported upon the top of the arms 5 to hold the seat back 12 in a substantially horizontal position. This construction permits of ready access to the pins 19 should they become loose or broken and also enables the conductor to allow a sick passenger to lie down upon two adjacent seats.

In order to shift the seat bottom 6 simultaneously with the seat back I may provide any suitable operating connections between the hanger and said seat bottom, but I preferably provide the device shown which consists of two spaced depending fingers 27 arranged upon the under face of the seat bottom and adapted to straddle the cross portion or bar 15 of the hanger. As shown the fingers 27 are formed by bifurcating one end of a metal plate 28 which is secured upon the seat bottom by screws or similar fastenings passed through apertured attaching feet 29 formed integral with said plate. Two of the plates 28 are provided upon the seat and they are arranged adjacent to its ends at points midway its side edges. This construction will cause the seat to be automatically shifted when the back is reversed as indicated in full and dotted lines in Fig. 1.

Each of the seats is also preferably provided with a shiftable foot rest or support 30 which is adapted to be automatically operated at the same time the back of the seat is shifted. The foot rest 30 is double and in the form of a frame consisting of two transverse bars 31 connected by longitudinal bars 32, which latter are adapted to support the feet. The frame 30 is loosely hung for swinging or tilting movement upon the cross bar 15 of the hanger 13, preferably by forming in the center of the lower edges of the cross bars 31 notches or seats 33 adapted to receive the bar 15. By hanging the frame or foot rest 30 in this manner it will be seen that it will be shifted automatically when the seat bottom and seat back are shifted and that when the hanger is in either of its normally inclined positions, said foot rest will also assume an inclined position so that one of the bars 32 is lowered to an operative position beneath the seat back 12 and the other of said bars 32 is elevated and in contact with the bottom of one of the side bars 3 of the frame as clearly illustrated in the drawings. The bars 32 are beveled or so shaped that they will not be seen at the front of the seat frame when they are elevated in contact with the front side bar 3 of the latter. It will be noted that by constructing and hanging the double foot rest or support in this manner, it will assume a horizontal and partially elevated position when the hanger 13 is in its vertical intermediate position so that the floor of the car beneath the seat frame may be more readily swept and cleaned.

In order to permit all or a plurality of seats upon one side of the car to be simultaneously reversed I operatively connect their hangers 13 to an operating or reversing bar 34 arranged for horizontal sliding movement in suitable guides 35 in the uprights 2 at one end of the seats or upon the side of the car. The operative connection between the bar 34 and each of the hangers is preferably in the form of a slot and pin connection and consists of a screw stud 37 arranged in a threaded aperture in the bar 34 and adapted to project into and slide in a longitudinal slot 38 formed in the offset portion 16 of one of the hanger arms 14. The operating bar 34 is formed at one of its ends, which end is at one end of the car with a rack 39 adapted to mesh with a pinion arranged on a shaft 41 suitably journaled upon the side of the car and provided upon its outer end with a polygonal shaped portion 42 adapted to receive a similar shaped socket on one end of a removable crank handle 43. It will be seen that by rotating the crank 43 the bar 34 may be slid longitudinally to actuate the hangers 13 and simultaneously reverse the seats.

I may provide any suitable means for holding the operating bar 34 against movement for the purpose of locking the seats in their adjusted positions, but I preferably employ the one illustrated which consists in forming in the pinion or gear 40 an annular series of recesses or openings 44 any one of which is adapted to receive a locking dog 45 which is pivoted at 46 in a bracket 47 upon the car frame. The free end of the dog 45 has a projection to enter one of the recesses or seats 44 and its pivoted end is formed with flat faces 48 adapted to be engaged by a spring 49 which is fixed in the bracket 47 and adapted to hold the dog in either a lowered operative position as shown in full lines in Fig. 9 or in an elevated inoperative position shown in dotted lines in said figure.

The construction, operation and advantages of my improved car or coach seat will be readily understood from the foregoing detail description taken in connection with the accompanying drawings and the following brief statement. When it is desired to reverse the seats, that is to move them from the full line to the dotted line position shown in Fig. 1, the locking dog 45 is disengaged from the gear or pinion 40 and thrown up to an elevated position in which it will be held by the spring 49. The crank 43 is then rotated in the proper direction to move the reversing or operating bar 34 longitudinally and thereby simultaneously swing the hangers or operating members of the seats from one side to the other of the latter. As said hanger or member 13 of each seat is swung upwardly the seat back attached to its arms will be tilted to a vertical position and then lifted so that the pins 19 leave the notches 21 in the guides 20, this movement of the seat back being due to its weighted or overbalanced lower or bottom portion. When the arms 14 of the hanger are vertical or midway the two inclined positions of the latter the pins 19 are out of contact with the guides 20 and said pins do not again engage the same until said arms swing downwardly upon the other side of the seat, whereupon the pins 19 drop into the other notches 21 and the continued movement of the arms 14 causes the seat back to assume its inclined position. As the hanger 13 swings upon its pivot 17 its lower portion or cross bar 15 will simultaneously actuate the seat bottom 6 and the double foot rest 30 as above described and as clearly illustrated in Fig. 1 of the drawings. After the seats have been reversed they are locked by swinging the dog 45 downwardly into engagement with one of the recesses or openings 44 in the gear 40. By providing a plurality of the recesses 44 it will be seen that the bar 34 may be locked at any desired point and hence the hangers 13 may be locked in a vertical position so that the foot rests 30 are elevated to a position that will enable the floor beneath the seats to be easily cleaned. This locking device as well as the connection of all of the seats for simultaneous operation serves to prevent one of the seats being reversed without reversing the others and hence prevents one passenger from occupying more than one seat. By connecting all of the seats on one side of the car for simultaneous operation it will be seen that they may be quickly and easily reversed and that it will be impossible for them to be roughly handled by the party who reverses them. It will be further noted that the construction of the seat is exceedingly simple and hence strong and durable and that the seats may be produced at a comparatively small cost.

While I have shown and described the preferred embodiment of my invention it will be understood that I do not limit myself to the showing set forth since various changes in the form, proportion and minor details of construction may be resorted to without departing from the spirit or sacrificing any of the advantages of the invention.

Having thus described my invention what I claim is:

1. In a car seat, the combination of a frame, a substantially U-shaped hanger having upright arms connected by a lower cross bar and pivoted adjacent to their lower ends to said frame, a reversible seat back connected to the upper portions of said arms, a seat bottom upon said frame and a reversible or double foot rest loosely hung for tilting movement from the cross bar of the U-shaped hanger, said foot rest comprising longitudinally extending foot supporting bars connected by transverse end bars formed in their bottom faces at their centers with recesses to loosely receive the cross bar of the U-shaped hanger, whereby when the hanger is shifted to reverse the seat back said foot rest will be automatically reversed.

2. In a car seat, the combination of a frame having corner posts united by longitudinal bars and transverse bars, a U-shaped hanger having upright arms pivoted intermediate their ends to the transverse bars and having their lower ends connected by a cross bar, a seat back connected to the upper ends of said arms, a seat bottom, and a double foot rest hung for tilting movement on the cross bar of the U-shaped hanger and adapted to be limited in its swinging movement by the longitudinal bars of the frame.

3. In a car seat, the combination of a frame having corner posts united by longitudinal and transverse bars, U-shaped hangers having upright arms united at their lower ends by a cross bar and having the lower portions of said arms pivoted to said transverse bars, guide plates connecting the corner posts and having adjacent to their ends seats and inclines leading to said seats, an overbalanced seat back pivoted between the upper portions of the arms of the hanger, pins upon the lower corners of the seat back to engage said guide plates and move over said inclines and into and out of said seats, a shiftable seat bottom supported by the longitudinal bars of the frame and having spaced fingers to receive the cross bar of the hanger between them and a double foot rest loosely hung from the cross bar of the hanger for tilting movement.

In testimony whereof I hereunto affix my signature in the presence of two witnesses.

MURDOC M. MURCHISON.

Witnesses:
T. L. FENMER,
J. H. FOOTE, Jr.